United States Patent [19]
Schmidt et al.

[11] Patent Number: 6,099,921
[45] Date of Patent: Aug. 8, 2000

[54] FORMABLE DECORATIVE GREENERY

[75] Inventors: Martin Schmidt; Lillian Nancy Schmidt; Steven Schmidt; Karl Schmidt, all of Portland, Oreg.

[73] Assignee: Martin Schmidt & Sons LLC, Portland, Oreg.

[21] Appl. No.: 09/137,497

[22] Filed: Aug. 20, 1998

[51] Int. Cl.[7] .............................. A01N 3/00; A41G 1/00
[52] U.S. Cl. ........................ 428/22; 428/10; 428/27; 428/17; 156/61; 29/428
[58] Field of Search ........................ 428/10, 27, 22, 428/17; 493/956; 156/61; 72/369

[56] References Cited

U.S. PATENT DOCUMENTS

| | | |
|---|---|---|
| D. 344,249 | 2/1994 | Carmichael .............................. D11/120 |
| 1,694,125 | 12/1928 | Jopson . |
| 1,935,514 | 11/1933 | Meis . |
| 2,258,442 | 10/1941 | Brenner . |
| 3,046,685 | 7/1962 | Blum . |
| 3,793,126 | 2/1974 | McAdams . |
| 4,144,365 | 3/1979 | Scudder et al. ............................ 428/10 |
| 4,792,471 | 12/1988 | Lee . |
| 4,942,692 | 7/1990 | Colbert ................................... 47/41.12 |
| 5,110,635 | 5/1992 | Creegan ................................... 428/10 |
| 5,235,780 | 8/1993 | Colbert ................................... 47/41.12 |
| 5,299,382 | 4/1994 | Carmichael ............................ 47/41.01 |
| 5,501,889 | 3/1996 | Church ................................... 428/66.5 |

*Primary Examiner*—Deborah Jones
*Assistant Examiner*—Wendy Boss
*Attorney, Agent, or Firm*—Miller Nash LLP

[57] ABSTRACT

A formable decoration including an elongate formable member, decorative greenery, and attachment apparatus. The attachment apparatus attaches the decorative greenery to the formable member. The formable decoration may be formed into a decorative shape such as a straight line, an arch, a candy cane, and a wreath. The formable decoration may then be reformed into multiple decorative shapes.

11 Claims, 1 Drawing Sheet

U.S. Patent     Aug. 8, 2000     6,099,921
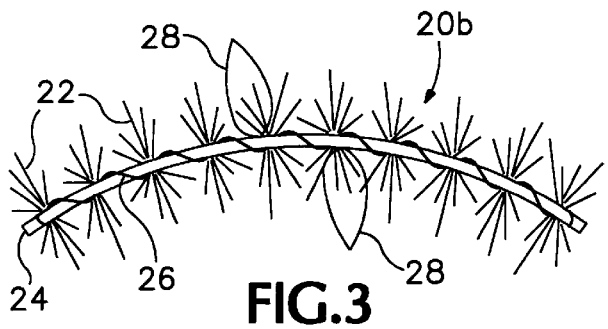
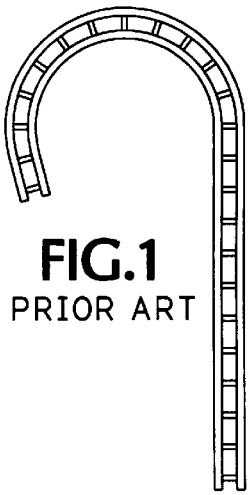
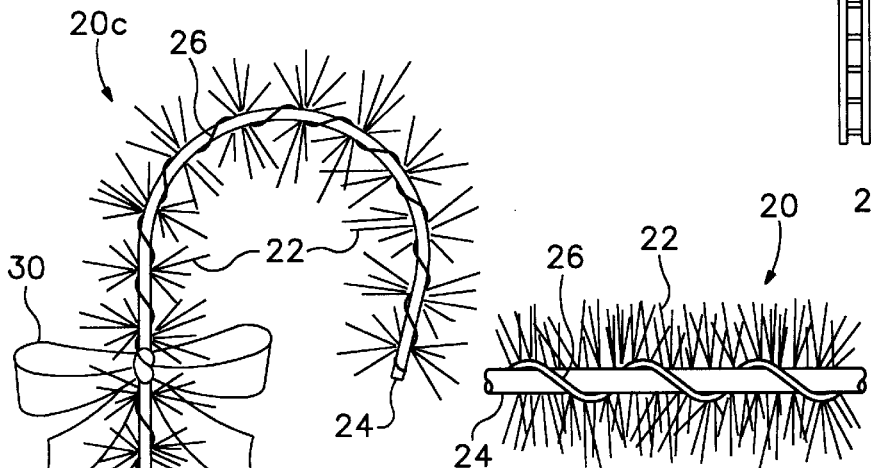
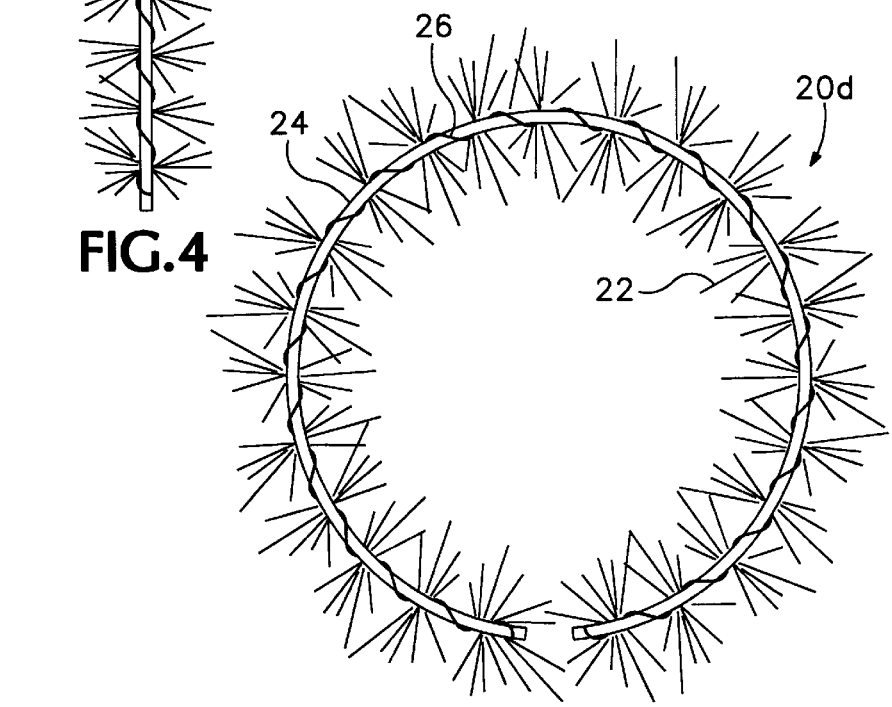
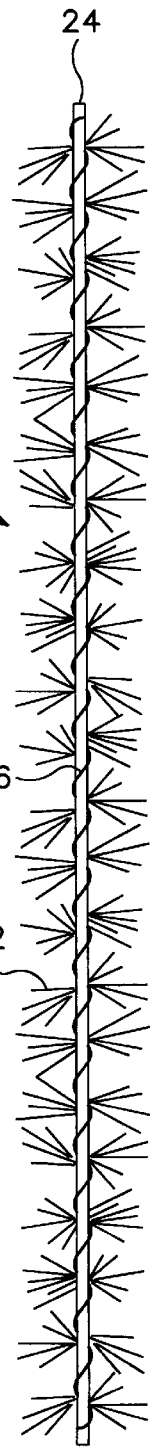

FORMABLE DECORATIVE GREENERY

BACKGROUND OF THE INVENTION

The present invention relate, to a formable decorative greenery such as a Christmas wreath.

One of the first signs of the approaching Christmas season is the adornment of front doors with a decorative greenery charm in the shape of a wreath or a candy cane. Over the fireplace there is nothing more inviting than a decorative greenery arch mantlepiece. And on the table, hostesses place a long straight greenery centerpiece.

Christmas decorations may be purchased along with the family Christmas tree at a local Christmas tree lot. They may also be purchased from florists. Still another popular method of obtaining these decorations is from local school children who knock on neighbors' doors to sell the decorations as a fund raiser.

A typical Christmas decoration is made by attaching greenery to a stiff single or double wire frame or plastic frame. An example of such a frame is shown in FIG. 1. A frame of this type used for a wreath is welded into a ring shape. Frames of this type have a predetermined shape that cannot be altered. Because the shape of the Christmas decoration is unalterable, many problems arise.

For example, a Christmas tree lot owner will generally place an order for pre-shaped Christmas decorations based on his prior experience with the seasonal demand. For example, a lot owner might order 100 straight centerpieces, 500 wreaths, 50 arches, and 50 candy canes. However, in any particular season, he could sell out of straight centerpieces and arches, but be left with 100 wreaths and 45 candy canes. Further, he may have been asked many times for those decorations that he has sold out. A Christmas tree lot owner may even loose sales of trees to disappointed customers who demand one-stop shopping. The next year, after reformulating his order, the lot owner may be faced with yet another shift in demand. The frustrating problem of having too many of one decoration and not enough of another cannot be solved with traditional decorations.

A florist who prepares fresh Christmas decorations is faced with a problem similar to the lot owner's problem because the florist has to purchase the pre-made frames. However, because the forms do not wilt and die like the greenery covered completed decorations, a florist may purchase excess of each frame. Storing excess frames is a problem to small shops. Also, if the florist prepares one of each decoration in advance, the florist may be left with some of the decorations but be struggling to produce other decorations according to customers' demands.

School children who knock on neighbors' doors to sell the decorations as a fund raiser usually carry samples to the door in advance of the season to take orders. This solves the problem of knowing how many of each decoration to order. However, the children have to struggle with carrying multiple samples or choose only one sample to bring door to door.

Shipping pre-shaped decorations is also problematic. First, the shapes are not optimally designed to take up a minimal amount of space. Secondly, if multiple shapes are shipped together, loading the decorations in a truck is similar to piecing together a difficult three-dimensional puzzle.

Even buyers have problems with pre-shaped decorations. If more than one family member is approached by children attempting to raise money by selling pre-shaped decoration and each subsequently buys a pre-shaped decoration, a family may end up with four wreaths and they only have a front door, a back door, and a garage door. Also, bringing a pre-shaped Christmas decoration such as a straight centerpiece as a hostess gift may turn into an uncomfortable situation if the hostess already has a centerpiece or another guest brings a centerpiece.

What is needed is decoration that overcomes the aforementioned problems of known systems.

BRIEF SUMMARY OF THE INVENTION

A formable decoration of the present invention solves the aforementioned problems. For example, a Christmas tree lot owner can buy 700 formable decorations and, if he has any left, will always be able to provide a customer with his first choice of decoration shape. A florist will only have to store the relatively compact wire and may prepare a few formable decorations with confidence that most or all will be sold. School children will only have to carry one sample formable decoration to show their neighbor customers. Shipping formable decorations is also easy since they can be shipped straight and thus take up a minimal amount of space. Further, since the formable decorations are shipped in a single configuration, loading a truck is a simple process. Finally, because the formable decoration can be formed into any of a multitude of shapes, buyers and gift receivers can put the extra formable decorations to alternative uses.

The formable decoration of the present invention preferably includes an elongate formable member, decorative greenery, and attachment apparatus. The attachment apparatus attaches the decorative greenery to the formable member. The formable decoration may be formed into a decorative shape such as a straight line, an arch, a candy cane, and a wreath. The formable decoration may then be reformed into multiple decorative shapes.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 1 is a prior art rigid frame.

FIG. 2 is a back view of a formable decoration of the present invention in a straight shape.

FIG. 3 is a back view of a formable decoration of the present invention in an arched shape.

FIG. 4 is a back view of a formable decoration of the present invention in a candy-cane shape.

FIG. 5 is a back view of a formable decoration of the present invention in a wreath shape.

FIG. 6 is a expanded detail view of a section of the formable decoration.

DETAILED DESCRIPTION OF THE INVENTION

FIGS. 2–5 are back views of a formable decoration of the present invention. Specifically, FIG. 2 shows the formable decoration in a straight shape 20a, FIG. 3 shows the formable decoration in an arched shape 20b, FIG. 4 shows the formable decoration in a candy cane shape 20c, and FIG. 5 shows the formable decoration in a wreath shape 20d. As will become apparent from the disclosure, these shapes are meant to be exemplary and are not meant to limit the scope of the invention.

FIG. 6 is an enlarged view of a section of a formable decoration, indicated generally as 20. Decorative greenery 22 is attached to an elongate formable member 24 by attachment apparatus 26. Since both the elongate formable member 24 and the attachment apparatus 26 are formable, the formable decoration 20 may be formed into decorative shapes such as those shown in FIGS. 2–5.

The elongate formable member 24 may be a length of copper tubing. However, any material that can be easily be bent, and yet holds it shape without sagging or changing, would be suitable.

Although the decorative greenery 22 is preferably any combination of fresh cut noble, cedar, and/or juniper, other types of greenery may be used. For example, brightly colored flowers may be used to create wreaths, hearts, crosses, arches, or other shapes suitable for weddings, funerals, get well arrangements, Valentines Day decorations. Plastic greenery may be used to allow the formable decoration to be used annually at the Christmas season. Dried flowers may be used for a year-round "country" decoration that would brighten any room.

In addition to the decorative greenery 22, pine cones 28 and/or ribbon 30 may be added to further enhance the decorative nature of the formable decoration 20. Other suitable additions include, but are not limited to, small toys, seasonal decorations, candy, and glitter.

The attachment apparatus 26 is preferably a length of wire. The length of wire, as shown in FIG. 6, may be wrapped around the decorative greenery 22 and the elongate formable member 24 in a substantially spiral-like manner. By wrapping the wire around the formable member 24 so as to secure the decorative greenery 22 thereto, a quality formable decoration is created.

After the decorative greenery 22 has been attached to the formable member 24, the formable decoration 20 may be bent into a multitude of shapes. Further, if a current shape is no longer desirable, the formable decoration may be straightened and then bent into an alternate shape. (It should be noted that straightening the formable decoration is not mandatory, but often makes the formation of shapes easier.) The formable decoration 20 may be used and reused multiple times.

If the formable decoration 20 begins in the straight line shape 20a shown in FIG. 2, the formable decoration may easily be bent into an arch shape. One method of putting the formable decoration into the shape of an arch begins with the step of placing the straight formable decoration 20a on a flat surface such as a table. The next step is to slowly bend both ends of the formable decoration slightly towards the user. This simple method creates the attractive arch shaped formable decoration 20b shown in FIG. 3.

Beginning once again with the formable decoration 20 in the straight line shape 20a shown in FIG. 2, the formable decoration may easily be bent into a candy cane shape. One method of putting the formable decoration into the shape of a candy cane shape begins with the step of placing the straight formable decoration 20a on a flat surface such as a table. The next step is to slowly bend one end of the formable decoration towards the user until a U-shape is formed in the top portion of the formable decoration. This method creates the candy cane shaped formable decoration 20c shown in FIG. 4.

One method to create the wreath shaped formable decoration 20d shown in FIG. 5 begins with the formable decoration in the straight line shape 20a shown in FIG. 2. The formable decoration in the straight formable decoration shape 20a is placed on a flat surface such as a table. The next step is to slowly bend both ends of the formable decoration towards the user until the decoration is in a ring like shape and the ends substantially meet. Greenery, decorations, or ribbon may be used to disguise the small space between the ends. Alternatively, the ends may be held together by a twist tie. This method creates the exemplary wreath shaped formable decoration 20d shown in FIG. 5.

It should be noted that the formable decoration 20 may be bent into multiple shapes. For example, in addition to the shown shapes, the formable decoration may be bent into a heart shape, cross shape, or may be turned on its side for wrapping containers or vases. The shapes are only limited by the imagination.

It should also be noted that the length of the elongate formable member 24 sets the approximate length of the formable decoration 20. However, various sizes of elongate formable members 24 are within the scope of the invention. Further, multiple formable decorations 20 may be used together to create elaborate designs.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A formable decoration comprising:
    (a) an elongate shape retainable formable member;
    (b) decorative greenery; and
    (c) attachment apparatus, said attachment apparatus attaching said decorative greenery to said elongate shape retainable formable member;
    (d) wherein said formable decoration may be formed into a decorative shape.

2. The formable decoration of claim 1 wherein said elongate formable member is a length of copper tubing.

3. The formable decoration of claim 1 wherein said decorative greenery includes fresh cut noble, cedar, and juniper.

4. The formable decoration of claim 1 wherein said attachment apparatus is a length of wire, said length of wire wrapped around said decorative greenery and said elongate formable member.

5. The formable decoration of claim 1 wherein said decorative shape is a straight line.

6. The formable decoration of claim 1 wherein said decorative shape is an arch.

7. The formable decoration of claim 1 wherein said decorative shape is a candy cane.

8. The formable decoration of claim 1 wherein said decorative shape is a wreath.

9. The formable decoration of claim 1 wherein said formable decoration may be reformed into another decorative shape.

10. A method for creating a multi-form decoration comprising the steps of:
    (a) attaching decorative greenery to an elongate shape retainable formable member;
    (b) bending said elongate shape retainable formable member into a decorative shape; and
    (c) repeating step (b) until a desired decorative shape is obtained.

11. The method of claim 10 wherein said step of attaching decorative greenery further includes the step of wire wrapping decorative greenery to said elongate shape retainable formable member.

* * * * *